United States Patent
Borean et al.

(10) Patent No.: US 9,200,548 B2
(45) Date of Patent: Dec. 1, 2015

(54) SPARK IGNITION INTERNAL COMBUSTION ENGINE HAVING INTAKE VALVES WITH VARIABLE ACTUATION AND DELAYED CLOSURE

(71) Applicant: C.R.F. Societa Consortile per Azioni, Orbassano (Torino) (IT)

(72) Inventors: Fabio Borean, Moncalieri (IT); Andrea Stroppiana, Turin (IT); Sabino Luisi, Turin (IT); Francesco Vattaneo, Turin (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 14/201,223

(22) Filed: Mar. 7, 2014

(65) Prior Publication Data

US 2014/0338327 A1 Nov. 20, 2014

(30) Foreign Application Priority Data

May 17, 2013 (EP) .................................. 13168369

(51) Int. Cl.
| | |
|---|---|
| *F01L 13/00* | (2006.01) |
| *F01L 9/02* | (2006.01) |
| *F02D 13/02* | (2006.01) |
| *F02D 15/04* | (2006.01) |
| *F02D 43/00* | (2006.01) |

(52) U.S. Cl.
CPC .............. *F01L 13/0015* (2013.01); *F01L 9/025* (2013.01); *F02D 13/0226* (2013.01); *F02D 15/04* (2013.01); *F02D 43/00* (2013.01); *F01L 2013/0089* (2013.01)

(58) Field of Classification Search
CPC .................. F01L 13/0015; F01L 9/025; F01L 2013/0089; F02D 13/0226; F02D 15/04; F02D 43/00

USPC ................ 60/605.2; 123/90.12, 90.15, 90.24, 123/90.48
See application file for complete search history.

(56) References Cited

U.S. PATENT DOCUMENTS

| 8,096,281 | B2 * | 1/2012 | Canino et al. ................. 123/321 |
| 2005/0229900 | A1 | 10/2005 | Weber et al. | |
| 2008/0149055 | A1 * | 6/2008 | Canino et al. .............. 123/90.12 |

FOREIGN PATENT DOCUMENTS

| EP | 0803642 B1 | 11/2000 |
| EP | 1344900 A2 | 9/2003 |
| EP | 1555398 A1 | 7/2005 |
| EP | 1653057 A1 | 3/2006 |
| EP | 1936132 A1 | 6/2008 |
| GB | 2478635 A | 9/2011 |

OTHER PUBLICATIONS

European Search Report for corresponding European Application No. 13168369.0, dated Jan. 20, 2014 completed Jan. 9, 2014.

* cited by examiner

*Primary Examiner* — Kenneth Bomberg
*Assistant Examiner* — Dapinder Singh
(74) *Attorney, Agent, or Firm* — Heslin Rothenberg Farley & Mesiti P.C.; Victor A. Cardona, Esq.

(57) ABSTRACT

A spark-ignition supercharged internal-combustion gasoline engine is equipped with a system for variable actuation of the intake valves including a pressurized fluid chamber set between intake valve and a respective control cam, and an electrically actuated valve, the opening of which vents the pressure chamber so as to cause rapid closing of the valve, as a result of the respective elastic return means, even when the respective cam would tend to keep the valve open. The variable-valve-actuation system is used in combination with control cams of the intake valves shaped in such a way as to generate an intake valve lift profile including a boot portion with substantially constant lift. The boot portion is provided in the final part of the opening cycle of the intake valve, after bottom dead center.

13 Claims, 7 Drawing Sheets

FIG. 7 though in principle it not excluded, in the case of the
SPARK IGNITION INTERNAL COMBUSTION ENGINE HAVING INTAKE VALVES WITH VARIABLE ACTUATION AND DELAYED CLOSURE

CROSS REFERENCE TO RELATED APPLICATIONS

This application claims priority from European patent application No. 13168369.0, filed on May 17, 2013, the entire disclosure of which is incorporated herein by reference.

FIELD OF THE INVENTION

The present invention relates to multi-cylinder internal-combustion engines, of the type comprising:

at least one intake valve and at least one exhaust valve for each cylinder, each provided with respective elastic return means which bias the valve into a closed position, for controlling respective intake and exhaust conduits, at least one camshaft, for actuating the intake valves and the exhaust valves of the engine cylinders by means of respective tappets, wherein at least each intake valve has a variable actuation, being governed by the respective tappet, against the action of the aforesaid elastic return means, by interposition of hydraulic means including a pressurized fluid chamber, facing which is a pumping piston connected to the valve tappet, said pressurized fluid chamber being configured to be connected by means of an electrically actuated valve to a discharge channel in order to uncouple the variable-actuation valve from the respective tappet and bring about rapid closure of the valve as a result of the respective elastic return means, and electronic control means for controlling each electrically actuated valve in such a way as to vary the time and the extension of the opening of the variable-actuation valves as a function of one or more operating parameters of the engine, wherein said engine is a spark-ignition engine, in particular a supercharged spark-ignition engine, in particular a gasoline engine.

PRIOR ART

The Applicant has for some time now developed electronically controlled hydraulic devices of the type specified above, for variable actuation of engine valves. The present applicant is the proprietor of numerous patents and patent applications regarding engines equipped with systems of this type. For immediate reference, FIG. 1 of the annexed drawings shows a cross-sectional view of an engine according to the art, as described of the European patent No. EP 0 803 642 B1 filed in the name of the present Applicant.

Figure 1:
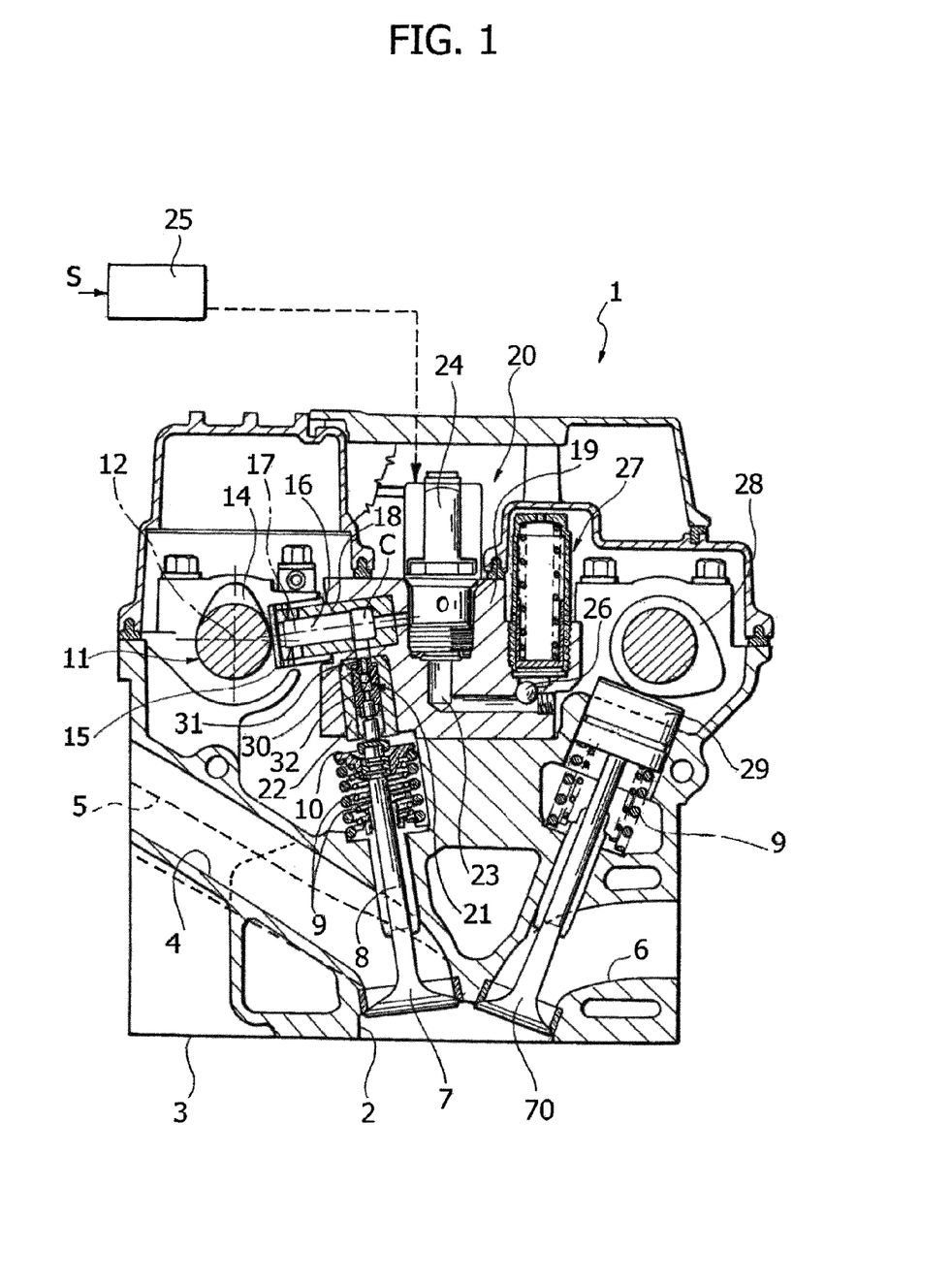
FIG. 1 is a cross-sectional view of an engine according to the prior art, of the type described, for example, in the European patent No. EP 0 803 642 B1 filed in the name of the present applicant, which is here shown to illustrate the fundamental principles of a variable-valve-actuation system of the type already proposed by the present Applicant.

With reference to the above FIG. 1, the engine illustrated therein is a multicylinder engine, for example, an engine with four in-line cylinders, comprising a cylinder head 1.

The cylinder head 1 comprises, for each cylinder, a cavity 2 formed by the base surface 3 of the cylinder head 1, defining the combustion chamber, into which two intake conduits 4, 5 and two exhaust conduits 6 open. Communication of the two intake conduits 4, 5 with the combustion chamber 2 is controlled by two intake valves 7, of the traditional mushroom type, each comprising a stem 8 slidably mounted in the body of the cylinder head 1.

Each valve 7 is biased towards the closing position by springs 9 set between an internal surface of the cylinder head 1 and an end cup 10 of the valve. Communication of the two exhaust conduits 6 with the combustion chamber is controlled by two valves 70, which are also of a traditional type, associated to which are springs 9 for return towards the closed position.

Opening of each intake valve 7 is controlled, in the way that will be described in what follows, by a camshaft 11 rotatably mounted about an axis 12 within supports of the cylinder head 1 and comprising a plurality of cams 14 for actuation of the intake valves 7.

Each cam 14 that controls an intake valve 7 co-operates with the plate 15 of a tappet 16 slidably mounted along an axis 17, which, in the case of the example illustrated in the prior document referred to above, is directed substantially at 90° with respect to the axis of the valve 7. The plate 15 is biased against the cam 14 by a spring associated thereto. The tappet 16 constitutes a pumping piston slidably mounted within a bushing 18 carried by a body 19 of a preassembled unit 20, incorporating all the electrical and hydraulic devices associated to actuation of the intake valves, according to what is described in detail in what follows.

The pumping piston 16 is capable of transmitting a force to the stem 8 of the valve 7 so as to bring about opening of the latter against the action of the elastic means 9 by means of pressurized fluid (preferably oil coming from the lubrication circuit of the engine) present in a pressure chamber C that the pumping piston 16 faces, and by means of a piston 21 slidably mounted in a cylindrical body constituted by a bushing 22, which is also carried by the body 19 of the preassembled unit 20.

Once again in the known solution illustrated in FIG. 1, the pressurized fluid chamber C associated to each intake valve 7 can be set in communication with an exhaust channel 23 via an electrically actuated valve 24. The electrically actuated valve 24, which may be of any known type, in particular a solenoid valve, and suited for the function illustrated herein, is controlled by electronic control means, designated as a whole by 25, as a function of signals S indicating operating parameters of the engine, such as the position of the accelerator and the engine r.p.m.

When the solenoid valve 24 is open, the chamber C enters into communication with the channel 23 so that the pressurized fluid present in the chamber C flows into the aforesaid channel and an uncoupling is obtained of the cam 14 and of the respective tappet 16 from the intake valve 7, which thus returns rapidly into its closing position under the action of the return springs 9. By controlling the communication between the chamber C and the exhaust channel 23, it is consequently possible to vary as desired the time and the stroke of opening of each intake valve 7.

The exhaust channels 23 of the various solenoid valves all lead out into one and the same longitudinal channel 26 communicating with pressure accumulators 27, just one of which is visible in FIG. 1.

All the tappets 16 with the associated bushings 18, the pistons 21 with the associated bushings 22, the solenoid valves 24 and the corresponding channels 23, 26 are carried by and made in the aforesaid body 19 of the preassembled unit 20, to the advantage of the rapidity and ease of assembly of the engine.

The exhaust valves 70 associated to each cylinder are controlled, in the embodiment illustrated in FIG. 1, in a traditional way, by a respective camshaft 28, via respective tappets 29, even though in principle it not excluded, in the case of the prior document referred to, is an application of the hydraulic actuation system also to control of the exhaust valves.

Once again with reference to FIG. 1, the variable-volume chamber defined within the bushing 22 and facing the piston 21 (which in FIG. 1 is illustrated in its condition of minimum volume, the piston 21 being in its top-dead-centre position) communicates with the pressurized fluid chamber C via an opening 30 obtained in an end wall of the bushing 22. The aforesaid opening 30 is engaged by an end prong 31 of the piston 21 in such a way as to obtain hydraulic braking of the movement of the valve 7 in the closing step, when the valve is close to the closing position, in so far as the oil present in the variable-volume chamber is forced to flow into the pressurized fluid chamber C passing through the clearance existing between the end prong 31 and the wall of the opening 30 engaged thereby. In addition to the communication constituted by the opening 30, the pressurized fluid chamber C and the variable-volume chamber of the piston 21 communicate with one another via internal passages provided in the body of the piston 21 and controlled by a non-return valve 32, which enables passage of fluid only from the pressurized chamber C to the variable-volume chamber of the piston 21.

During normal operation of the known engine illustrated in FIG. 1, when the solenoid valve 24 excludes communication of the pressurized fluid chamber C with the exhaust channel 23, the oil present in the aforesaid chamber transmits the movement of the pumping piston 16, imparted by the cam 14, to the piston 21 that governs opening of the valve 7. In the initial step of the movement of opening of the valve, the fluid coming from the chamber C reaches the variable-volume chamber of the piston 21 passing through the non-return valve 32 and further passages that set in communication the internal cavity of the piston 21, which has a tubular conformation, with the variable-volume chamber. After a first displacement of the piston 21, the prong 31 comes out of the opening 30 so that the fluid coming from the chamber C can pass directly into the variable-volume chamber through the opening 30, which is now free.

In the reverse movement of closing of the valve, as has already been said, during the final step the nose 31 enters the opening 30, causing hydraulic braking of the valve so as to prevent impact of the body of the valve against its seat, for example, following upon opening of the solenoid valve 24 that causes immediate return of the valve 7 into the closing position.

As an alternative to the hydraulic braking device illustrated in FIG. 1, the present applicant has also already proposed (see the European patent application No. EP 1 344 900 A2) a different solution, in which the piston 21 for controlling the intake engine valve is without an end nose, and the non-return valve 32, instead of being made in the body of the piston 21, is made in a fixed part. Moreover, in the wall of the bushing within which the piston 21 is slidably mounted there give out one or more passages communicating directly with the pressure chamber C. The aforesaid passages are shaped and positioned in such a way that they are intercepted progressively by the piston 21 in the final step of closing of the engine valve in order to form a restriction of the flow area of the fluid, with a consequent hydraulic-braking effect. In addition, in the solution proposed in the European patent application No. EP 1 344 900 A2, set between the piston 21 for controlling the engine valve and the stem of the engine valve is an auxiliary hydraulic tappet.

Figure 2:
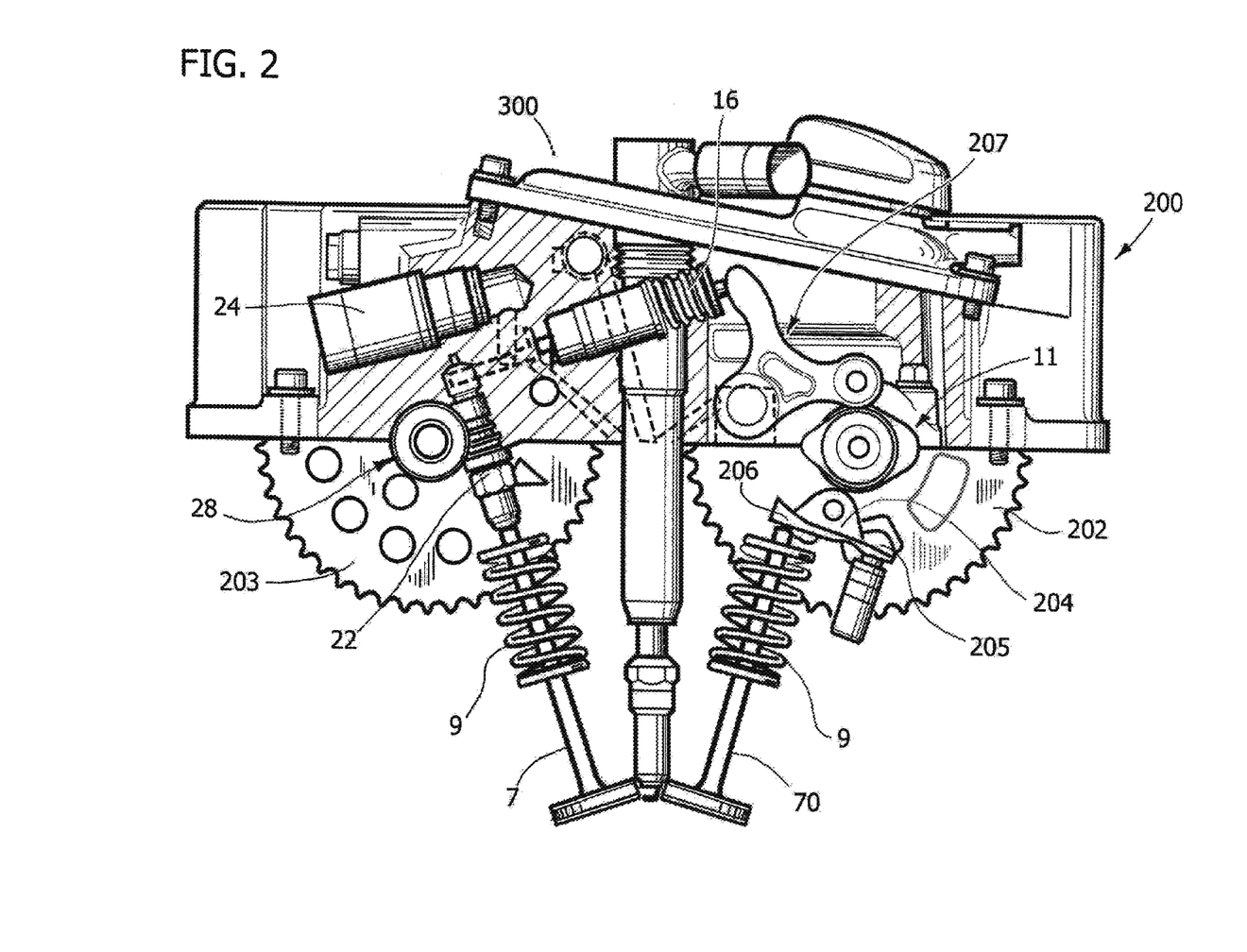
FIG. 2 is a cross-sectional view of a further application of the system proposed previously by the present Applicant, as illustrated in the European patent application No. EP 1 653 057 A1, characterized principally in that it envisages a single camshaft for controlling the intake valves and the exhaust valves.

In order to illustrate another important example of application already proposed by the present applicant, FIG. 2 of the annexed drawings shows the embodiment forming the subject of the prior European patent application No. EP 1 653 057 A1 filed in the name of the present Applicant. In this case, the engine is equipped with a single camshaft for controlling both the intake valves and the exhaust valves.

With reference to FIG. 2, all the members of the electronically controlled hydraulic device are carried by a single brick structure 200, which has a bottom surface that, in the mounted condition, corresponds to the plane passing through the axes of two shafts 11, 28. The shaft 11 is the only camshaft of the engine and is consequently provided both with the control cams of the intake valves and with the control cams of the exhaust valves of the engine, whereas the shaft 28 is a camless shaft having one end coming out of the cylinder head bearing a power takeoff that can be exploited for actuation of any auxiliary system.

Like the conventional engine, the two shafts 11, 28 have ends, which are also external to the cylinder head and carry gears 202, 203 designed to mesh with the transmission chain that transmits motion from the engine shaft to the shafts 11, 28.

The shaft 11, as has already been said, is provided both with the cams for actuation of the engine intake valves and with the cams for actuation of the exhaust valves. According to a solution already proposed in the prior European patent application No. EP 1555398 A1 filed in the name of the present applicant, the cams for controlling the intake valves control the latter by means of an electronically controlled hydraulic device of a type similar to the one that has been described with reference to FIG. 1. In FIG. 2, the components of the aforesaid device are designated by the same reference numbers as those that have been used in FIG. 1. Instead, the exhaust valves are governed mechanically by the respective cams of the shaft 11. As may be clearly seen in FIG. 2, the exhaust valves are governed via rockers 204, each of which has one end 205 pivoted on the structure of the cylinder head, an intermediate roller for contact with the respective cam, and the opposite end 206 that governs the respective exhaust valve 70. The pumping element 16 associated to each intake valve is, instead, governed by a rocker 207, which is pivoted to the structure of the brick 200 and has portions for engagement, respectively, with the control cam carried by the shaft 11 and with the pumping element 16, FIG. 2 also illustrates the spark plug 208 (and the corresponding coil 209) associated to the engine cylinder. As has already been said, the brick carries all the elements forming part of the electronically controlled hydraulic device for variable actuation of the intake valves 7, as well as all the channels of the hydraulic system associated to the aforesaid device.

From the European patent No. EP 1 936 132 B1 filed in the name of the present applicant there is known a further improvement of the known systems described previously, in which the main characteristic lies in the fact that the control cam of each intake valve is shaped in such a way as to generate a valve-lift profile that includes a boot portion with substantially constant lift.

As illustrated in the document No. EP 1 936 132 B1, the combination of a cam for control of the intake valve having the aforesaid characteristic with a variable-valve-actuation system of the type described above opens the way to a series of important improvements and operative advantages both in the case of gasoline spark-ignition engines and in the case of diesel compression-ignition engines.

However, in the document No. EP 1 936 132, in the case of a petrol engine the aforesaid boot portion with substantially constant lift in the intake-valve lift profile is provided in the initial part of the lift cycle of the intake valve, and in advance with respect to top dead centre (TDC) of the piston of the respective cylinder. Moreover, in the case of the aforesaid application, the electronic control means of the system for actuation of the intake valve are programmed to keep the aforesaid solenoid valve closed when the engine r.p.m. is below a pre-determined value.

In this way, when the engine r.p.m. is relatively low, and in any case lower than the aforesaid pre-determined value, the lift profile of the intake valve is uniquely determined by the profile of its control cam. As indicated, the aforesaid cam profile is such as to generate a boot portion with substantially constant lift in the valve-lift profile, in advance with respect to top dead centre. This determines the overlap of the exhaust phase with the subsequent intake phase of the engine, in so far as the intake valve, by opening in advance with respect to top dead centre, is already open in the final part of the previous exhaust phase.

Opening of the intake valve in the final part of the exhaust phase determines a scavenging of the combustion chamber in so far as the higher pressure existing in the intake manifold (in particular, in the case of a supercharged engine) with respect to the pressure existing in the exhaust manifold determines an increase in the mass of air introduced into the cylinder.

Once again in the case of the aforesaid application, at high engine r.p.m. the electronic control means of the solenoid valve are designed to keep the solenoid valve open in the phase preceding TDC, in such a way that the first part of the cam profile becomes ineffective and the intake valve remains closed substantially up to TDC. At such high r.p.m., in fact, an ample portion of crossing of the intake and exhaust phases is unfavourable to the performance of the engine.

However, the solution proposed in the document No. EP 1 936 132 makes no mention of optimization of operation of spark-ignition engines—especially supercharged ones—during operation at high loads (for example, at full load).

Typically, a supercharged spark-ignition engine is conditioned, during operation at high load, by the phenomenon of engine knock, and in general all the choices at the design and/or calibration level are oriented to the reduction of the tendency towards engine knock.

Resistance to engine knock of a spark-ignition internal-combustion engine generally depends upon the following factors:
the geometry of the combustion chamber;
the pressure and temperature of the air/fuel mixture upon ignition, which in turn depends upon:
temperature of the air downstream of the intake-air heat exchanger (intercooler);
residual burned gas within the combustion chamber (EGR); and
effective compression ratio,
the tendency to spontaneous ignition of the fuel (RON or MON octane number); and
the enrichment of the air/fuel mixture (if $\lambda$ is the relative air-fuel ratio, i.e., the ratio $\alpha/\alpha_{ST}$ between the effective air-fuel ratio $\alpha$ and the stoichiometric air-fuel ratio $\alpha_{ST}$, $\lambda<1$ is equivalent to an excess of fuel with cooling effect on the charge).

Typically, supercharged spark-ignition engines are calibrated, for operation at high loads, with the following operating parameters:
minimum enrichment of the mixture for minimizing the tendency to engine knock and preserving a sufficient temperature of the exhaust gases, with reduced impact on fuel consumption; and
delayed ignition timing (negative advance) to prevent engine knock.

It may be noted, however, at an experimental level, that the optimal conditions in terms of fuel consumption are obtained with operating parameters generally incompatible with those necessary for preventing engine knock. In greater detail, the optimal conditions in terms of fuel consumption occur with relative air-fuel ratio equal to unity (stoichiometric air-fuel ratio) and spark advance as close as possible to an optimal value, typically equal to a spark advance that results in the maximum pressure value in the combustion chamber at around 14° of crank angle after the combustion top dead centre or else in reaching a mass burned fraction equal to 50% (MBF50) at around 7° of crank angle after combustion top dead centre.

It is evident that the rich air-fuel ratio typical of operation at high loads does not make it possible to work with relative air-fuel ratio equal to 1, nor does the delayed ignition timing enable meeting one of the two conditions referred to above (whether MBF50 or pressure peak).

The inventors have in any case noted that the solution disclosed by the document No. EP 1 936 132 B1 for spark-ignition engines has substantially no application at high loads (but is, instead, conceived basically for operation at medium loads).

OBJECT OF THE INVENTION

The object of the invention is to solve the technical problems mentioned previously. In particular, the object of the invention is to optimize the efficiency of spark-ignition engines of a supercharged type in operation at high loads.

SUMMARY OF THE INVENTION

The object of the invention is achieved by an multi-cylinder internal-combustion engine having all the features specified at the beginning of the present description and moreover characterized in that:
the boot portion with substantially constant lift referred to above is envisaged in the final part of the intake-valve lift cycle and terminates after BDC; and
in that the aforementioned electronic control means are configured for controlling the aforesaid solenoid valve so that said boot portion with substantially constant lift will be reduced in duration by opening the solenoid valve when it is required to operate with a shorter closure delay of the intake valves.

The solution identified by the inventors is hence configured both to respond to the technical problems that have remained unsolved in the document No. EP 1 936 132 B1 and to overcome a technical prejudice that is found in the same document No. EP 1 936 132 B1.

In fact, in the document No. EP 1 936 132 B1 the main feature consisting in providing the control cam of each intake valve shaped in such a way as to generate a valve-lift profile that includes a boot portion with substantially constant lift is suitably adapted for a further embodiment exclusively conceived for compression-ignition engines, in particular diesel engines. In this embodiment, the boot portion with substantially constant lift is provided in the final part of the intake-valve lift cycle, after bottom dead centre (BDC).

The inventors have, instead, noted how the application of the aforesaid solution to spark-ignition engines—contrary to what is taught in document No. EP 1 936 132—results in beneficial effects that are decidedly appreciable in terms of specific fuel consumption during operation at high loads, clearly, in combination with a system for variable valve-lift actuation, for example, of the types described previously.

It should in particular be noted that the profile of the control cam of the intake valve according to the aforesaid second embodiment of the invention, if combined to a traditional valve control, would give rise to serious drawbacks in operation of the engine. In fact, on account of the high backflow of air in the intake conduit, which would always be present to its highest extent, difficulties at engine start would be generated, as well as a drastic reduction of the performance of the engine and an unacceptable increase of the pollutant emissions at the exhaust. The combination of a cam having the profile defined above with the variable-valve-actuation system also defined above makes possible a modulation from zero to a maximum of the duration in time of the aforesaid boot with constant lift in the cycle of opening of the intake valve, subsequent to bottom dead centre.

BRIEF DESCRIPTION OF THE FIGURES

Further characteristics and advantages of the embodiments of the invention will emerge from the ensuing description with reference to the annexed figures, which are provided purely by way of non-limiting example and in which.

DETAILED DESCRIPTION OF PREFERRED EMBODIMENTS OF THE INVENTION

Figure 3:
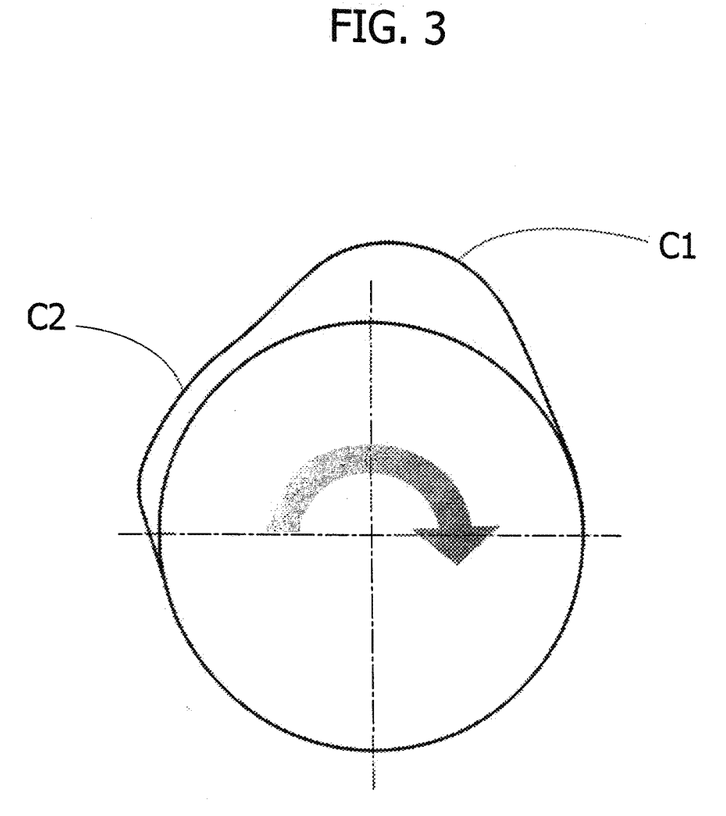
FIG. 3 is a schematic illustration of the profile of the control cam of the intake valve according to what is envisaged according to various embodiments of the present invention.
Figure 4:
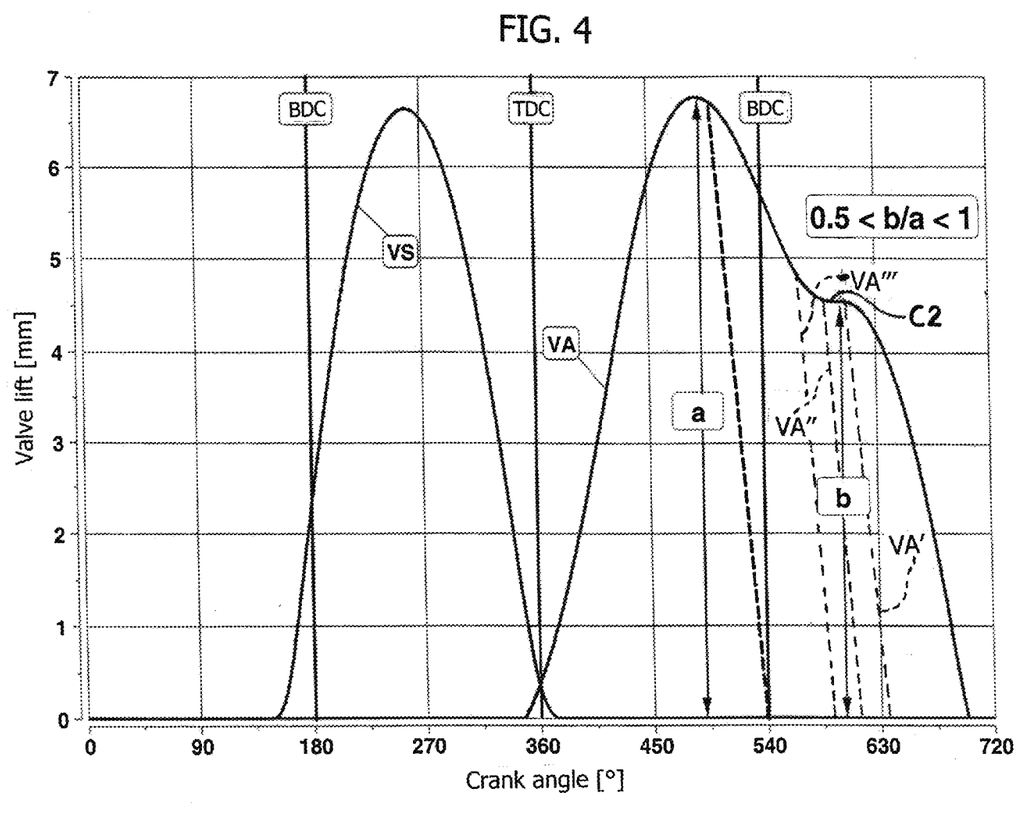
FIG. 4 illustrates the working principle of the embodiments of the invention according to FIG. 3.

With reference to FIG. 3, in a preferred embodiment of the invention, intended to be applied on a spark-ignition engine, in particular a supercharged and preferably gasoline engine, the control cams of the intake valves have the profile indicated schematically in FIG. 3 (with reference to a clockwise direction of rotation of the camshaft) so as to generate a lift profile of the intake valves of the type illustrated in FIG. 4. In this figure, the profile has been illustrated with reference to a clockwise direction of rotation of the cam.

According to the aforesaid embodiment, the cam comprises a first portion of profile C1 that determines the lift of the intake valve and has a boot portion C2, with substantially constant lift, in the final part of the lift cycle of the valve, so as to cause a closure of the intake valves with considerable delay with respect to the bottom dead centre (BDC) of the piston of the respective cylinder.

In this way, during rising of the piston, a backflow of part of the air (in so-called "gasoline-direct-injection—GDI" engines) or of the air/fuel mixture drawn in during the intake phase (in the case of an engine with gasoline injection upstream of the intake valves—the so-called "port-fuel-injection—PFI" engines), getting it to return into the same intake conduit.

As may be noted, the cam delays the closure of the intake valve by keeping the lift practically constant at a pre-set value for a given range of degrees of crank angle.

It should moreover be noted that where, in the present description and in the ensuing claims, the expression "boot with substantially constant lift" is used, this is intended to encompass both the case of a portion of the valve-lift cycle in which, the valve lift remains rigorously constant and the case in which the aforesaid lift does not anyway vary more than 0.2 mm/rad.

Delayed closure of the intake valve has as an immediate effect the reduction of the effective compression ratio, which reduces the tendency to knocking of the charge in the combustion chamber. In fact, as a result of delayed closure of the intake valve, the air (in GDI engines) or the air/fuel mixture (in PFI engines) that remains in the cylinder begins to be effectively compressed only after the aforesaid closure. The reduction of the effective compression ratio hence leads, as compared to the values that would be witnessed in a conventional engine, to a reduction of pressure and to a reduction of temperature at the instant in which the fuel is injected into the chamber in GDI engines, whereas for PFI engines it is the fresh charge that is affected, starting from the compression phase up to the end of the entire combustion cycle.

This enables at least three main interventions at the level of engine management to be carried out:
  increase of the spark advance: the ignition timing is less delayed and can be set in a position closer to the optimal value mentioned previously (chosen on the basis of the criterion of the peak pressure or of MBF50);
  reduction of the fuel enrichment: the decrease of the compression ratio and of the tendency to engine knock tends to nullify the requirements in terms of cooling of the charge so that it is possible to extend the region of the engine map in which the relative air-fuel ratio is unitary; and
  increase of boost pressure: this compensates for the loss of performance due to the decrease of filling (volumetric efficiency) caused by the backflow to the intake; the increase in the supercharge pressure may be obtained and modulated by means of the (electronic) control of the wastegate valve.

In FIG. 4, the diagram VA indicates the lift profile of the intake valve (VS instead refers to the lift diagram of the exhaust valve) obtained with a cam having a geometry of the type illustrated in FIG. 3, when the solenoid valve of the valve-actuation system is kept closed.

As the operating conditions of the engine vary, the part of the diagram constituting the boot C2 with constant lift can be reduced in duration (profiles VA', VA", the latter being characterized by a closure delay of the intake valves shorter than the delay that characterizes the former), by opening in due time of the solenoid valve of the actuation system, or eliminated altogether (diagram VA'''), by opening the solenoid valve of the actuation system at the crank angle corresponding to the beginning of contact between the boot portion C2 and the tappet. The diagram VA''' is hence characterized by an advanced opening of the solenoid valve of the actuation system as compared to the diagram VA". In turn, the diagram VA" is characterized by an advanced opening of the solenoid valve of the actuation system as compared to the diagram VA'.

It is to be noted that in each of the cases just mentioned in which there is a reduction or elimination of the closure delay of the intake valve, closing of the latter is of a ballistic type (which does not happen, evidently, when the solenoid valve of the actuation system is kept closed, diagram VA).

The more delayed the closing of the valve, the greater the delay in closing of the intake valves and the lower the effective compression ratio obtained, and hence the greater the backflow of air in GDI engines or of air/fuel mixture in PFI engines. Thanks to the variable-valve-actuation system, it is, however, possible to obtain a modulation of the aforesaid effect until coming back to the lift profile VA, which may be assimilated to that generated by a conventional cam, when it is necessary to operate with a shorter closure delay of the intake valves.

It should be noted that a cam such as that illustrated in FIG. 3 could not be used in an engine provided with a traditional valve actuation system. In this case, in fact, there would arise serious inconvenients would occur in the operation of the engine in so far as, on account of the high air or air/fuel mixture backflow, which is always present in its maximum extent, there would be difficulties upon engine start, a drastic reduction of the performance of the engine, and an unacceptable increase of the pollutant emissions.

The combination, instead, of a cam of the type illustrated in FIG. 3 with the variable-valve-actuation system of the type that has been described above enables regulation of the backflow effect so as to adapt it to the operating conditions of the engine.

Figure 5:
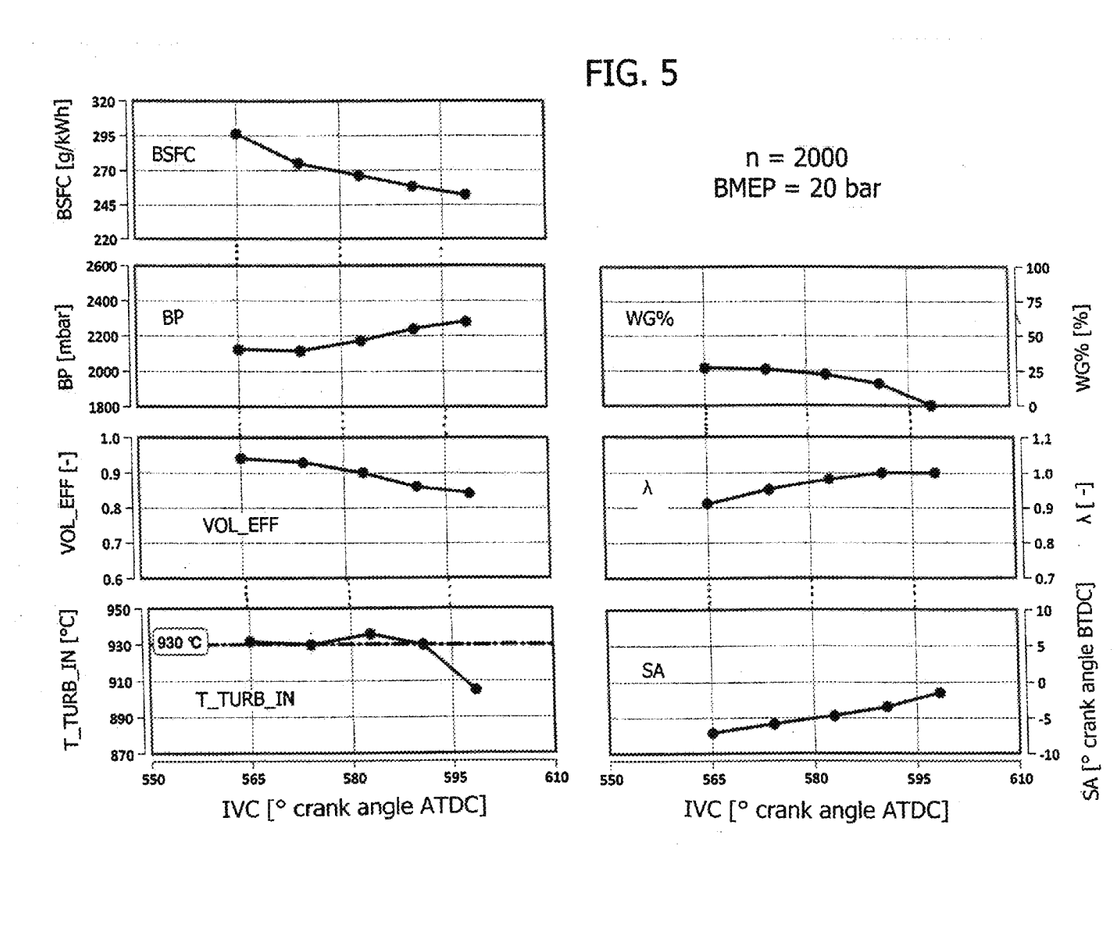
FIGS. 5 to 7 illustrate the variation of different operating parameters of a supercharged spark-ignition internal-combustion engine according to the invention as the intake valve closure angle varies, where each figure corresponds to a different engine speed.
Figure 6:
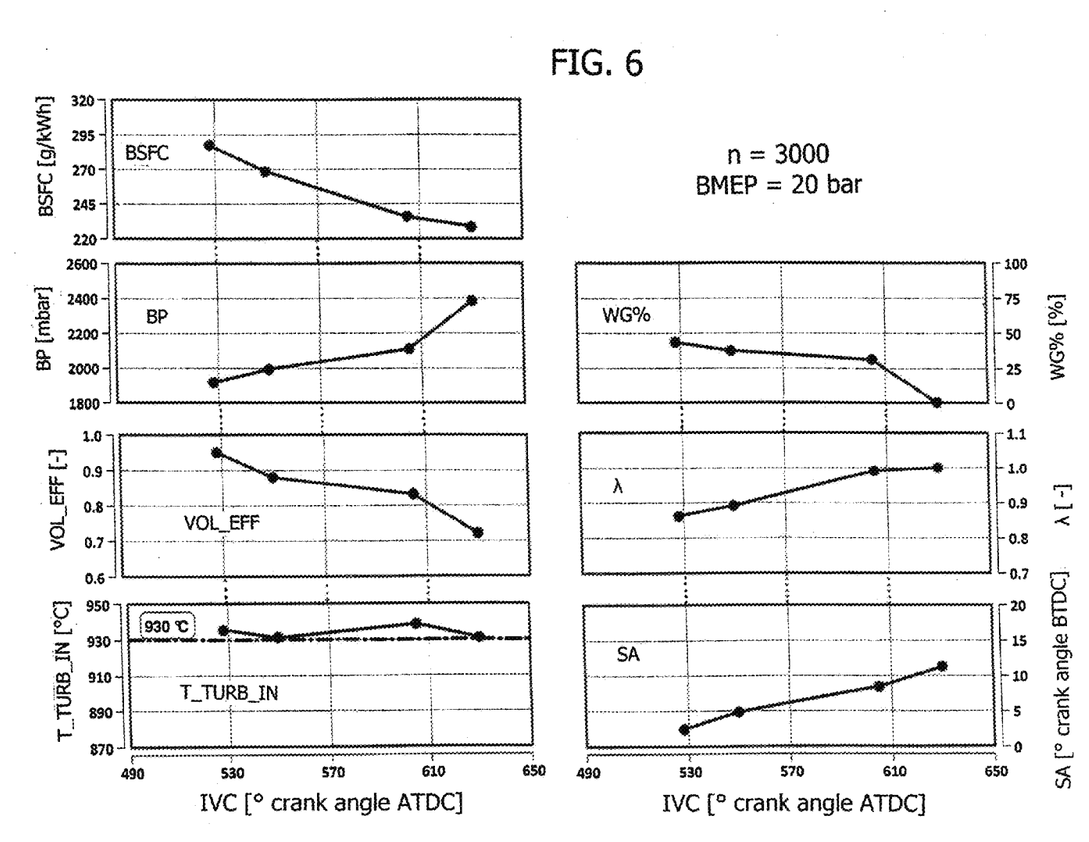
Figure 7:
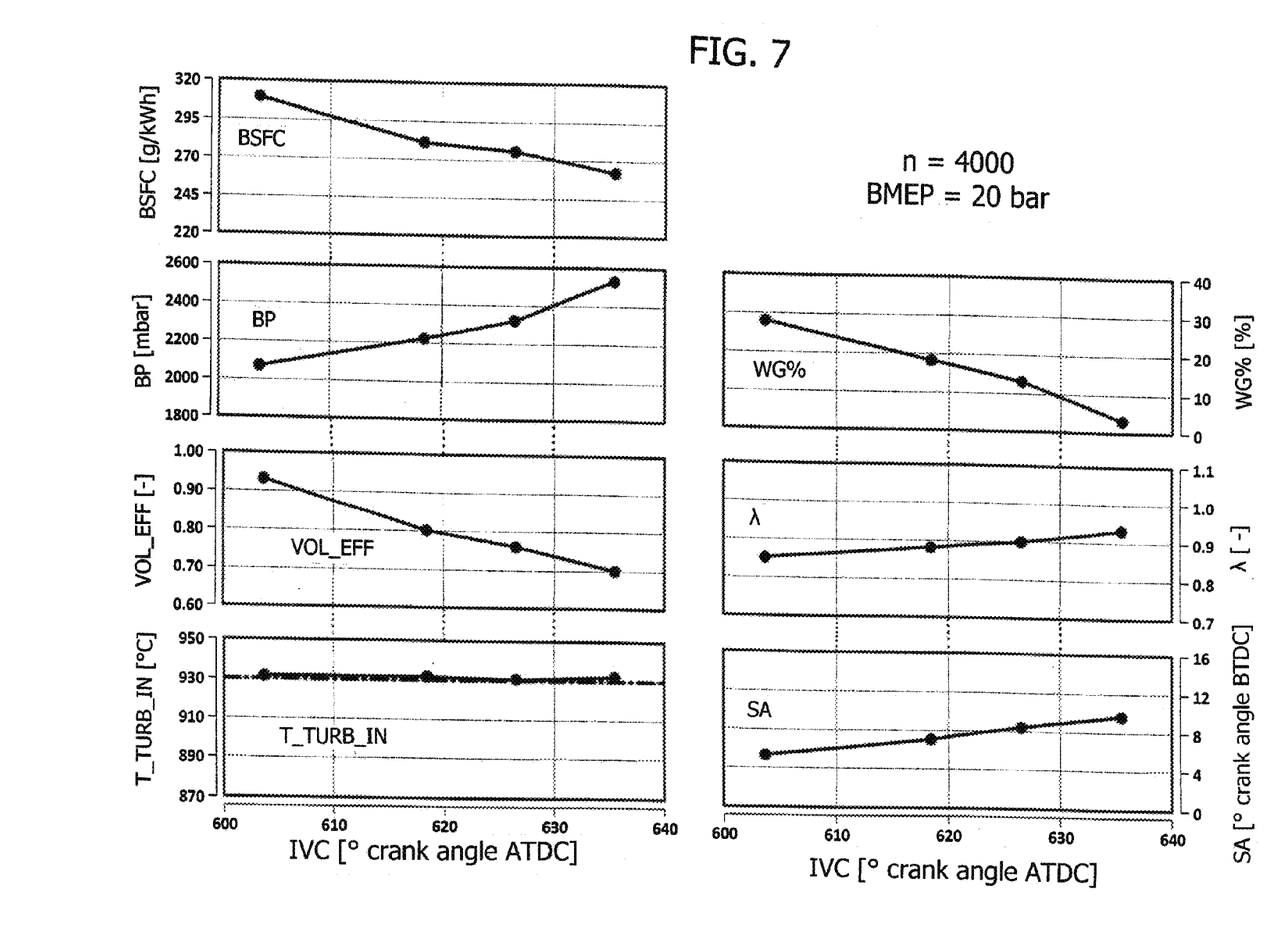

Finally, FIGS. 5 to 7 illustrate the variation of some operating parameters typical of a supercharged, spark-ignition, indirect-injection gasoline engine. Each diagram of FIGS. 5 to 7 is labelled by the physical quantity or the operating parameter of which it represents the plot. What differentiates the three figures is the speed of the internal-combustion engine, designated by the letter n, which is 2000 r.p.m. for FIG. 5, 3000 r.p.m. for FIG. 6, and 4000 r.p.m. for FIG. 7. The diagrams of FIGS. 5 to 7 moreover have been plotted for one and the same value of load of the internal-combustion engine, expressed via the value of brake mean effective pressure (b.m.e.p.) denoted by BMEP in the figures and equal to 20 bar.

The range of crank angles considered is the same for all the diagrams, as emerges clearly from FIGS. 5-7.

In the case in point, the diagrams of FIGS. 5 to 7 include:
a first diagram representing the plot of the brake specific fuel consumption BSFC (expressed in g/kWh) as a function of the intake-valve-closing (IVC) angle, where the IVC angle is expressed in degrees of crank angle after top dead centre (° crank angle ATDC) and where the reference top dead centre is that of combustion;
a second diagram representing the plot of boost pressure BP (expressed in millibar) of the internal-combustion engine as the IVC angle varies;
a third diagram representing the plot of the volumetric efficiency VOL_EFF of the engine as the IVC angle varies;
a fourth diagram representing the plot of the temperature T_TURB_IN (expressed in ° C.) of the gas at the inlet of the turbine of the turbocharger as the IVC angle varies;
a fifth diagram representing the plot of the opening percentage WG % of the wastegate valve of the turbocharger as the IVC angle varies;
a sixth diagram representing the plot of the relative air-fuel ratio λ as the IVC angle varies; and
a seventh diagram representing the plot of the spark advance SA as the IVC angle varies, wherein the spark advance is measured in degrees of crank angle before top dead centre (° crank angle BTDC); also in this case, clearly it is the top dead centre of combustion.

Thanks to the diagrams of FIGS. 5 to 7, it is possible to appreciate visually what has been described previously: in the first place, it is to be noted how, as the closure delay of the intake valve increases (i.e., as the IVC angle increases), the volumetric efficiency of the engine decreases appreciably in so far as the fraction of mass expelled by the combustion chamber before the closure of the intake valve is maximum. The effect is more marked at higher r.p.m. (to be noted in this connection is the difference of decrease passing from 2000 to 4000 r.p.m.).

In the column on the right of FIG. 5, it is moreover visible the combination of the three interventions described:
i) the spark advance is increased by an amount of around 10° of crank angle in each of the three operating points associated to FIGS. 5 to 7 (at 3000 and 4000 r.p.m. the ignition occurs even quite some time prior to TDC, whereas at 2000 r.p.m., with the same increase, the maximum advance is located practically at TDC, with consequent improvement of combustion and performance;
ii) the relative air-fuel ratio λ ranges from values of a little lower than unity to the value of unity corresponding to the maximum closure delay, which results in fuel saving; at 4000 r.p.m. and 20 bar of b.m.e.p., however (FIG. 7, as may happen in other operating points), the maximum relative air-fuel ratio settles just slightly below unity, so that in general the intervention that is implemented consists in the progressive increase of the relative air-fuel ratio as the closure delay of the intake valves increases; a preferential range within which the relative air-fuel ratio falls during the aforesaid intervention is 0.9-1 (endpoints included);
iii) the boost pressure is increased as the closure delay of the intake valve increases simply by partializing the wastegate valve until it is closed completely (or practically completely as regards the point of operation 4000 r.p.m.×20 bar b.m.e.p.) at the maximum value of closure delay.

It is consequently possible to define a method for controlling a supercharged spark-ignition internal-combustion engine in the high-load operating range, which comprises a variable valve actuation system of the type described previously and in which moreover the control cams of the intake valves are manufactured as the cam of FIG. 3. In the case in point, the aforesaid method includes the following steps:
controlling each electrically actuated valve 24 so as to actuate the intake valves via at least part of the boot portion C2 of the valve-lift profile generated by the corresponding control cam, thus causing a delayed closure of the intake valves and a reduction of the compression ratio of each cylinder;
progressively increasing the spark advance SA as the closure delay of the intake valves 7 increases;
supplying the engine with an air/fuel mixture having relative air-fuel ratio λ that progressively increases as the closure delay of the intake valves 7 increases; and
increasing the boost pressure BP by means of progressive partialization of the wastegate valve of the supercharger as the closure delay of the intake valves 7 increases.

In the light of the foregoing description, it is clear that the modulation of the closure delay occurs simply by varying the closure intervals of the solenoid valve 24, i.e., by varying the portion of the boot C2 that effectively results in a lift of the intake valves.

The spark advance SA is increased with respect to the conditions of operation at high load, where there is no delayed closure of the intake valves so as to tend towards the optimal value described previously, whatever the criterion chosen for its estimation.

As regards the brake specific fuel consumption BSFC, in the operating points considered in the data acquisitions of FIGS. 5 to 7 a maximum decrease that ranges from 15%-16%

(FIGS. 5 and 7) to 25% approximately (FIG. 6) is observed just in the range of intake valve closure angles considered.

What may be noted from the diagrams of FIGS. 5 to 7 is that within a certain range of degrees of crank angle the effect of the delayed closure of the intake valve gets more beneficial as the delay increases.

For this reason, in view of the fact that the maximum closure delay depends on the angular extension (both in the physical sense and in terms of degrees of crank angle) of the boot C2, the inventors have noted that the best results in terms of possibility of regulation of the system and efficiency are obtained by dimensioning the boot C2 so that it covers an angle of rotation of the engine shaft not less than 0° and not more than 150° after bottom dead centre (BDC) of the intake stroke.

Notwithstanding this, the inventors have found it to be particularly advantageous, in particular in combination with the choice of the range referred to above for the extension of the boot C2, the choice of a ratio between the substantially constant lift H (corresponding to the length "b" in FIG. 4) of the boot C2 and the maximum lift of the intake valve (designated by "a" in FIG. 4) comprised between 0.5 and 1.

Clearly, via the solenoid valve 24 of the variable valve actuation system of the intake valves it is possible to modulate the effective closure angle of each intake valve within the range indicated above depending upon the value required in a given operating point.

Of course, without prejudice to the principle of the invention, the details of construction and the embodiments may vary widely with respect to what has been described and illustrated herein purely by way of example, without thereby departing from the scope of the present invention.

What is claimed is:

1. A multi-cylinder internal-combustion engine, comprising:
    at least one intake valve and at least one exhaust valve for each cylinder, each provided with respective elastic return means that bias the valve into a closed position, for controlling the respective intake and exhaust conduits,
    at least one camshaft, for actuating the intake valves and the exhaust valves of the engine cylinders by means of respective tappets,
    wherein each intake valve is a valve with variable actuation, being controlled by a respective tappet against the action of the aforesaid elastic return means, by interposition of a hydraulic means including a pressurized fluid chamber, facing which is a pumping piston connected to the tappet of the valve,
    said pressurized fluid chamber being configured to be connected by means of an electrically actuated valve to a discharge channel in order to uncouple the valve with variable actuation from the respective tappet and cause rapid closure of the valve as a result of the respective elastic return means,
    electronic control means for controlling each electrically actuated valve in such a way as to vary the time and the extension of the opening of the variable-actuation valves as a function of one or more operating parameters of the engine,
    wherein the control cam of each intake valve is shaped in such a way as to generate a valve-lift profile that includes a boot portion with constant lift,
    wherein said engine is a spark-ignition engine, said boot portion with constant lift provided in the final part of the lift cycle of the intake valve and terminates after bottom dead center, and
    a wastegate valve of a turbocharger, wherein in a high-load operating range the boost pressure is increased by progressive partialization of the wastegate valve as a closure delay of the intake valves increases;
    said electronic control means configured for controlling said electrically actuated valve so that said boot portion with constant lift is reduced in duration by opening the electrically actuated valve when it is required to operate with a shorter closure delay of the intake valves.

2. The engine according to claim 1, wherein said boot portion covers an angle of rotation of the engine shaft of not less than 0< and not more than 150° after bottom dead center.

3. The engine according to claim 1, wherein the ratio between said constant lift of the boot portion and a maximum lift of the intake valve is comprised between 0.5 and 1.

4. The engine according to claim 1, wherein the aforesaid boot portion has a variation of lift not greater than 0.2 mm/rad.

5. The engine of claim 1 wherein said engine is a supercharged engine.

6. The engine of claim 1 wherein said engine is a gasoline engine.

7. A method for controlling an internal-combustion engine according to claim 1, in a high-load operating range, the internal-combustion engine being supercharged by means of the turbocharger, the method comprising the steps of:
    controlling said electrically actuated valve so as to actuate the intake valves via at least part of the boot portion of the valve-lift profile generated by the corresponding control cam, thus causing a delayed closure of the intake valves and a reduction of the compression ratio of each cylinder;
    progressively increasing the spark advance as the closure delay of the intake valves increases;
    supplying the engine with an air/fuel mixture having relative air-fuel ratio progressively increasing as the closure delay of the intake valves increases; and
    increasing the boost pressure by progressive partialization of a wastegate valve of the turbocharger as the closure delay of the intake valves increases.

8. The method according to claim 7, wherein the spark advance is increased tending towards an optimal value chosen, alternatively, as:
    a value of spark advance that results in a maximum value of pressure in the combustion chamber at around 14° of crank angle after top dead centre of combustion; or else
    a value of spark advance that enables reaching a mass burned fraction equal to 50% at around 7< of crank angle after top dead center of combustion.

9. The method according to claim 7, wherein the wastegate valve of the turbocharger is in a closed position at a maximum value of closure delay of the intake valves.

10. A method for controlling an internal-combustion engine according to claim 2, in a high-load operating range, the internal-combustion engine being supercharged by means of the turbocharger, the method comprising the steps of:
    controlling said electrically actuated valve so as to actuate the intake valves via at least part of the boot portion of the valve-lift profile generated by the corresponding control cam, thus causing a delayed closure of the intake valves and a reduction of the compression ratio of each cylinder;
    progressively increasing the spark advance as the closure delay of the intake valves increases;
    supplying the engine with an air/fuel mixture having relative air-fuel ratio progressively increasing as the closure delay of the intake valves increases; and increasing the boost pressure by progressive partialization of a wastegate valve of the turbocharger as the closure delay of the intake valves increases.

11. A method for controlling an internal-combustion engine according to claim 3, in a high-load operating range, the internal-combustion engine being supercharged by means of the turbocharger, the method comprising the steps of:
controlling said electrically actuated valve so as to actuate the intake valves via at least part of the boot portion of the valve-lift profile generated by the corresponding control cam, thus causing a delayed closure of the intake valves and a reduction of the compression ratio of each cylinder;
progressively increasing the spark advance as the closure delay of the intake valves increases;
supplying the engine with an air/fuel mixture having relative air-fuel ratio progressively increasing as the closure delay of the intake valves increases; and
increasing the boost pressure by progressive partialization of a wastegate valve of the turbocharger as the closure delay of the intake valves increases.

12. A method for controlling an internal-combustion engine according to claim 4, in a high-load operating range, the internal-combustion engine being supercharged by means of the turbocharger, the method comprising the steps of:
controlling said electrically actuated valve so as to actuate the intake valves via at least part of the boot portion of the valve-lift profile generated by the corresponding control cam, thus causing a delayed closure of the intake valves and a reduction of the compression ratio of each cylinder;
progressively increasing the spark advance as the closure delay of the intake valves increases;
supplying the engine with an air/fuel mixture having relative air-fuel ratio progressively increasing as the closure delay of the intake valves increases; and
increasing the boost pressure by progressive partialization of a wastegate valve of the turbocharger as the closure delay of the intake valves increases.

13. A multi-cylinder internal-combustion engine, comprising:
at least one intake valve and at least one exhaust valve for each cylinder, each provided with a respective spring that bias the valve into a closed position, for controlling the respective intake and exhaust conduits,
at least one camshaft, for actuating the intake valves and the exhaust valves of the engine cylinders by respective tappets,
wherein each intake valve is a valve with variable actuation, being controlled by a respective tappet against the action of the spring, by interposition of a pressurized fluid chamber, facing which is a pumping piston connected to the tappet of the valve,
said pressurized fluid chamber being configured to be connected by means of an electrically actuated valve to a discharge channel in order to uncouple the valve with variable actuation from the respective tappet and cause rapid closure of the valve as a result of the respective spring,
an electronic controller for controlling each electrically actuated valve in such a way as to vary the time and the extension of the opening of the variable-actuation valves as a function of one or more operating parameters of the engine,
wherein the control cam of each intake valve is shaped in such a way as to generate a valve-lift profile that includes a boot portion with constant lift,
wherein said engine is a spark-ignition engine, said boot portion with constant lift provided in the final part of the lift cycle of the intake valve and terminates after bottom dead center, and
a wastegate valve of a turbocharger, wherein in a high-load operating range the boost pressure is increased by progressive partialization of the wastegate valve as the closure delay of the intake valves increases.

\* \* \* \* \*

UNITED STATES PATENT AND TRADEMARK OFFICE
CERTIFICATE OF CORRECTION

PATENT NO.         : 9,200,548 B2                                    Page 1 of 1
APPLICATION NO.    : 14/201223
DATED              : December 1, 2015
INVENTOR(S)        : Borean et al.

It is certified that error appears in the above-identified patent and that said Letters Patent is hereby corrected as shown below:

Column 12, Line 48: Claim 8, Delete "7<" and insert -- 7° --

Signed and Sealed this
Nineteenth Day of April, 2016

Michelle K. Lee
*Director of the United States Patent and Trademark Office*